(No Model.) 2 Sheets—Sheet 1.

W. F., J. P. & J. G. AHLERT.
VELOCIPEDE.

No. 287,989. Patented Nov. 6, 1883.

WITNESSES.
Wilmer Bradford
Edwin Derby

INVENTORS
Wm F. Ahlert
Jos P. Ahlert
John G. Ahlert
By C. W. M. Smith
Attorney (No Model.) 2 Sheets—Sheet 2.
W. F., J. P. & J. G. AHLERT.
VELOCIPEDE.
No. 287,989. Patented Nov. 6, 1883.
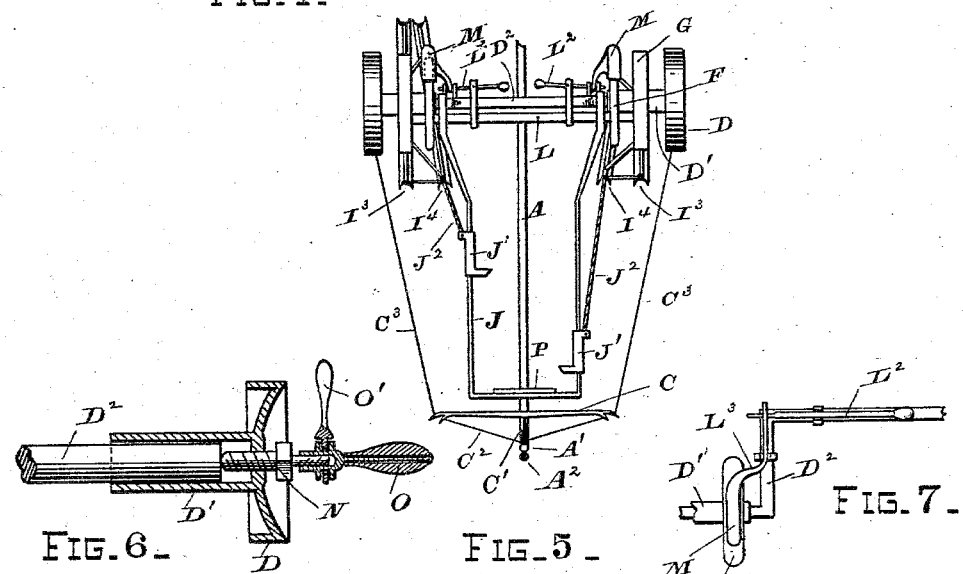
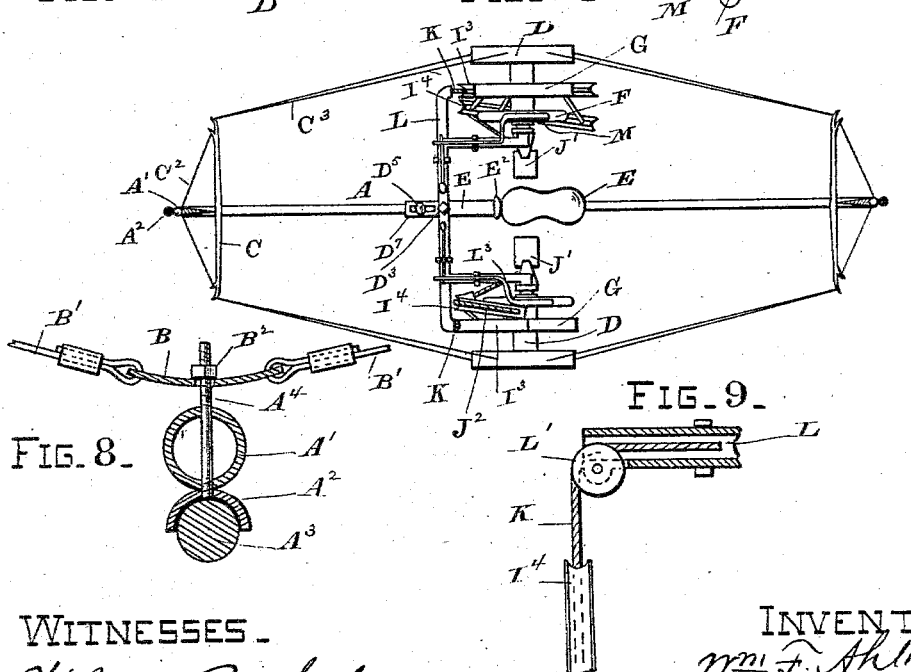

UNITED STATES PATENT OFFICE.

WILLIAM F. AHLERT, JOSEPH P. AHLERT, AND JOHN G. AHLERT, OF SAN FRANCISCO, CALIFORNIA.

VELOCIPEDE.

SPECIFICATION forming part of Letters Patent No. 287,989, dated November 6, 1883.

Application filed May 10, 1883. (No model.)

*To all whom it may concern:*

Be it known that we, WILLIAM F. AHLERT, JOSEPH P. AHLERT, and JOHN G. AHLERT, citizens of the United States, residing at San Francisco, in the county of San Francisco and State of California, have invented certain new and useful Improvements in Velocipedes, of which the following is a specification.

Our invention relates to certain new and useful improvements in single-wheel velocipedes or monocycles, and more particularly to certain improvements upon a device for which Letters Patent of the United States were granted to Joseph Ahlert on the 23d day of May, 1882, No. 258,207, for improvements in velocipedes; and the objects of our invention are, first, to provide a monocycle in which motion is imparted to the carrying-wheel by means of vibrating sectors keyed upon the hub of the carrying-wheel, and connected by means of cords or wires to pedals moved in an alternate reciprocating manner; second, to provide a new and improved arrangement of the supporting bars and rods of the saddle; third, to provide an improved form of construction for the main carrying-wheel; fourth, to provide a single-wheel velocipede with an improved brake; and, also, to other details of construction, which will be hereinafter more fully described. We accomplish these objects by the mechanism illustrated in the accompanying drawings, in which—

Figure 1:
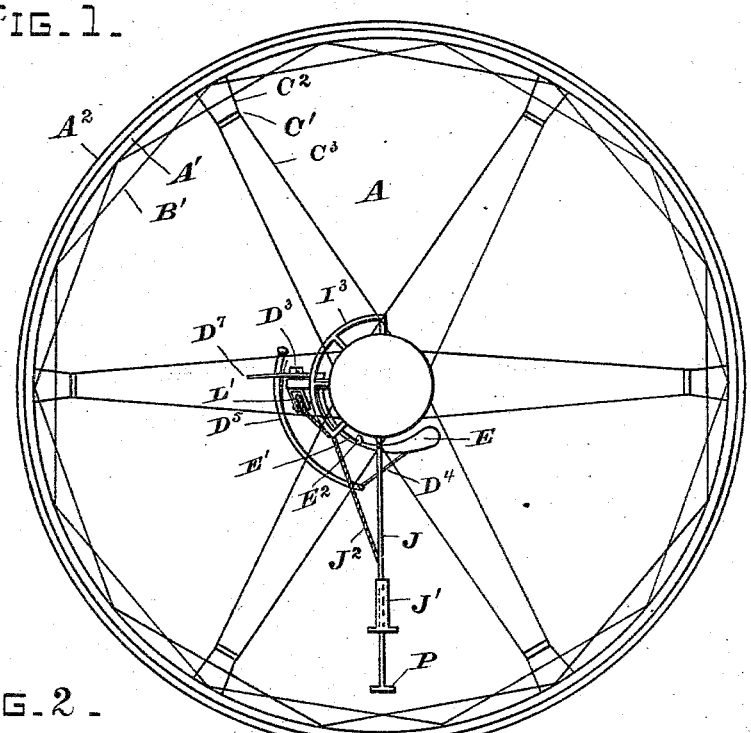
Figure 2:
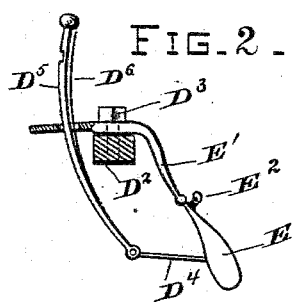
Figure 3:
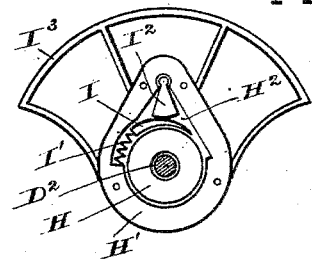

Figure 1 is a side elevation, showing the principal working parts of our velocipede. Fig. 2 is a detail view, showing the manner of attaching the seat or saddle to the axle. Fig. 3 is a sectional side view of one of the sectors. Fig. 4 is a vertical sectional view of the lower half of the wheel, showing the foot-board and driving mechanism. Fig. 5 is a horizontal sectional view of the velocipede. Fig. 6 is a sectional plan view of the roller-handle. Fig. 7 is a plan view of the brake. Fig. 8 is a cross-section through the rim of the carrying-wheel. Fig. 9 is a sectional plan view, showing the rope-carrying tube.

Similar letters of reference are used to designate like parts throughout the several views.

A represents the carrying-wheel, which may be formed in the usual manner; but we prefer to construct it in the manner shown in Fig. 8—that is to say, the felly $A'$ is constructed of gas-pipe, to which a second or outer band of piping, $A^2$, is firmly attached. This outer circular band is formed from a piece of pipe which has been divided or sawed apart lengthwise, so that when placed in position it will form a wheel having a concave face adapted to receive and sustain the rubber tire $A^3$. The semi-cylindrical band $A^2$ is attached to the main felly by means of screw-bolts $A^4$, which are first passed through the gas-pipe $A'$, and then enter the band $A^2$, and are headed down upon the concave side of the same. A small plate, B, is then passed over the inner end of the bolt, and the ends of the tangent trusses or stay-rods $B'$ are made fast to the opposite ends thereof, as shown in Fig. 8, and by screwing down or slackening up the nut $B^2$ upon the threaded bolt $A^4$ the tension of said stay-rods can be regulated.

At various points around the inner edge of the rim, and equidistant from each other, we attach the transversely-projecting bows or rods C, which may rest upon a small support or standard, $C'$, attached to the felly. Each end of these rods is provided with two ears or lugs, as shown in Fig. 4, to the undermost of which are attached the stay-rods $C^2$, which connect with the rim of the wheel.

Stay-rods $C^3$ are attached to the outer ends of the bows, and are extended inwardly in diverging lines from their point of attachment to each end of the bows, yet each series of stay-rods upon each side of the wheel converge toward a central point and are attached to the flanged disks D D, rigidly connected to the hubs $D' D'$, journaled upon the bent axle $D^2$. These last-named stay-rods are screw-threaded upon their ends, and are provided with nuts and washers, whereby the tension of the same may be regulated.

The axle is bent outward toward the front end of the machine in order that space may be left to accommodate the rider as he sits upon the saddle E, provided at its forward end with a small pad, $E^2$, which prevents the rider from slipping forward, and is attached to the axle by a hinged connection with the downwardly-curved bar $E'$, pivoted to the axle $D^2$ by a bolt, D³, in such a manner as to permit of the rider deflecting his seat to either the right or left hand side of the machine for the purpose of guiding or directing the forward motion of the same.

A short rod, D⁴, is attached to the under side of the saddle, and is connected by a hinge-joint with the notched curved rod D⁵, provided with a flat spring, D⁶, the said rod and spring passing through and engaging with an aperture made in the lip D⁷, formed on the bar or rod E'.

Upon each side of the machine we firmly attach to the hubs D' the brake-wheels F F, and intermediate or between them we place the loosely-journaled clutch-cases G G. The hubs D' are provided with a flange or disk, H, keyed upon the inner end thereof, and side flanges, H' H', (which form the clutch-case,) are then placed upon each side of the disk. The flanges, when in place, completely cover the disk, yet do not bind upon it, or upon the hub or axle, so tightly as to prevent the free vibration of the said flanges. A chamber or recess, H², is left in the upper portion of the flanges, as seen in Fig. 3, the lower portion of the recess being occupied by a curved wedge, I, the butt of which rests against a coiled spring, I', which prevents jarring or concussion of the operating parts and keeps the wedge in continual contact with the solid sector or rocker I², which occupies the upper part of the chamber, and has its bearing or pivotal point in the side flanges, H' H', while its lower curved face bears upon the curved wedge above described.

Projecting outwardly from the casing or side flanges, H', are radial arms, which carry the sector or segmental wheel I⁴, set inclined or at an angle to the plane of its revolution. A secondary sector, I³, is attached by suitable arms to the flange or casing, and is of the same radius as the sector I⁴, but is set at right angles to the plane of its revolution.

Downwardly-projecting rods J J are attached to the axle and connected together at their lower ends by the foot-board P, as shown in Fig. 4. Pedals J' J', having suitable friction-rollers, are adapted to slide up and down upon the vertical portion of the rods J, and are connected by cords J² J² to the top ends of the sectors I⁴ I⁴, the said cords passing over the face of the sectors in the usual manner.

A cord, K, is attached to the lower end of the sector I³, and is carried over a small friction roller or pulley, L', and thence through the tube L, securely clipped to the under side of the front portion of the bent axle D², and thence over a pulley at the opposite end of the tube, and made fast to the lower end of the outside sector. The said pulleys L' are journaled in lugs attached to the ends of the tubes L, as shown in Fig. 9. The clips which serve to retain the rope-tube in place also support lever-handles L² L², placed one on each side of the machine and on top of the axle within easy reach of the rider. The outer ends of these handles enter a slot in one end of the curved pivoted rod L³, the opposite end of which carries the brake-shoe M, which is adapted to bind upon the face of the brake-wheel F.

The heads of the flanged disks D are made sufficiently thick to receive the threads of the bolt N, which is screwed tight against the end of the stationary axle, and tends to lessen the friction of the revolving hub. The outer ends of these bolts are provided with a square shoulder or head by which they may be set up or slackened. One of these bolts (by preference that one upon the right-hand side of the machine) is continued out past its head, and a left-hand screw-thread is turned upon such projected portion, thereby adapting it receive the roller-handle O. The inner end of said handle is provided with an annular recess, or with flanges which hold in place the loosely-journaled transverse handle O', all of which is clearly illustrated in Fig. 6. When the operator wishes to move his machine without riding it, he screws the handle to its place. Then, by grasping the axial handle O in his right hand and pressing forward, the wheel is caused to roll over the surface of the ground, it being steadied and kept in an upright position by means of the backwardly-projecting handle O', which is grasped in the left hand.

When not in use, the saddle is lowered to the position shown in Fig. 2, (in order that it may not be in the way of the rider when starting the velocipede,) and is held in that position by the pressure of the spring D⁶ against the end of its receiving-slot.

The operation of our improved velocipede will be as follows, to wit: The rider starts the velocipede in the usual manner and steps quickly upon the foot-board P, at the same time grasping the knob on the top of rod D⁵, forcing it downward through the opening in the lip D⁷ and throwing the saddle E up between his legs, in which position it is held by the notched rod and its spring D⁶. The rider then seats himself astride the saddle, and placing his feet upon the pedals J' J' presses them down in an alternate reciprocating manner. As the pedals slide up and down upon the vertical rods J J they produce, through the medium of the connecting-cords J² and K, a vibrating or rocking movement of the sectors, which, by means of the rockers I² I² and curved wedges I I, impart a uniform rotary motion to the carrying-wheel, and the rider is easily and rapidly carried over the surface of the ground.

It should here be remarked that the cords J², connecting with the pedals, are those which produce a direct action upon the inner sectors and the gripping-rockers, while the cord K, which is connected to the outside sector, serves to retract the rocker or produce a reverse revolution of the sectors upon the opposite side of the machine, this movement being accomplished alternately upon either side of the machine and placing the operating parts in a position to be operated upon by the rider giving a downward stroke with his leg.

Having thus described our invention, what we claim, and desire to secure by Letters Patent, is—

1. A single-wheel velocipede, in which rotation of the wheel is produced by the vibration of the sectors $I^3$ $I^4$ and the gripping of the rocker $I^2$ upon a wedge, I, carried by the wheel-hub, the vibration of the sectors being produced by suitable connecting-cords and pedals, constructed, arranged, and operating substantially in the manner and for the purpose shown and described.

2. In a velocipede, the combination, with the wheel-hub $D'$ and axle $D^2$, of the tension or set bolt N, substantially as and for the purpose shown and set forth.

3. In a velocipede having an axle, $D^2$, wheel-hub D, and set-bolt N, provided upon its outer projecting end with a left-hand screw-thread, the combination of the auxiliary steering or propelling roller handle O and sustaining or balancing handle $O'$, loosely journaled upon said handle O, when constructed and arranged to operate substantially in the manner and for the purpose specified.

4. In a velocipede, the hinged saddle E, connected to the side swiveling rod, $E'$, attached to the bent axle $D^2$, and provided with a forwardly-projecting perforated lip, $D^7$, rod $D^4$, notched rod $D^5$, and flat spring $D^6$, constructed, arranged, and operating substantially as described.

5. In a monocycle, the combination of the rim $A'$, rim-bows C, stay-rods $C^2$ and $C^3$, hubs or disks $D' D'$, journaled upon the bent axle $D^2$, and carrying the slip-and-grip sectors $I^3$ and $I^4$, connecting-cords $J^2$ and K, and pedals $J'$, operating upon the downwardly-projecting rods or guides J J, connected at the bottom by a foot-board, P, constructed, arranged, and operating substantially as described, for the purpose specified.

6. In a monocycle, the slip-and-grip sectors $I^3$ $I^4$, connected to the same hub and carrying a pivoted rocker, $I^2$, curved wedge I, and spring $I'$, contained within a casing, G, and arranged to operate substantially as shown and set forth.

7. In a monocycle, the slip-and-grip sectors $I^3$ $I^3$, arranged upon either side of the machine and connected by a cord, K, passing through a guide-tube, L, connected to the bent axle, and operated substantially as and for the purpose set forth.

8. In a monocycle, the combination, with the brake-wheel F, secured upon the hub of the carrying-wheel, of the brake-shoe M, brake-rod $L^3$, and lever-handle $L^2$, pivoted upon the bent axle, and arranged to operate substantially in the manner and for the purpose set forth.

In testimony that we claim the foregoing we have hereunto set our hands and seals.

WILLIAM F. AHLERT. [L. S.]
JOSEPH P. AHLERT. [L. S.]
JOHN G. AHLERT. [L. S.]

Witnesses:
CHAS. E. KELLY,
WILMER BRADFORD.